(12) United States Patent
Sander

(10) Patent No.: US 9,138,667 B2
(45) Date of Patent: Sep. 22, 2015

(54) METHOD FOR CLEANING FILTER STRUCTURES IN FILTRATION INSTALLATIONS FOR FILTERING LIQUID PRODUCTS, AND A FILTRATION INSTALLATION

(75) Inventor: Ulrich Sander, Worms (DE)

(73) Assignee: KHS GmbH, Dortmund (DE)

( * ) Notice: Subject to any disclaimer, the term of this patent is extended or adjusted under 35 U.S.C. 154(b) by 918 days.

(21) Appl. No.: 13/319,751

(22) PCT Filed: Jul. 7, 2010

(86) PCT No.: PCT/EP2010/004143
§ 371 (c)(1),
(2), (4) Date: Nov. 10, 2011

(87) PCT Pub. No.: WO2011/009528
PCT Pub. Date: Jan. 27, 2011

(65) Prior Publication Data
US 2012/0048814 A1    Mar. 1, 2012

(30) Foreign Application Priority Data

Jul. 23, 2009    (DE) .................. 10 2009 034 550

(51) Int. Cl.
| B01D 61/00 | (2006.01) |
| B01D 63/00 | (2006.01) |
| C02F 1/44 | (2006.01) |
| B01D 29/66 | (2006.01) |
| B01D 61/14 | (2006.01) |
| B01D 63/02 | (2006.01) |
| B01D 63/06 | (2006.01) |
| B01D 65/00 | (2006.01) |
| B01D 65/02 | (2006.01) |

(52) U.S. Cl.
CPC .............. *B01D 29/66* (2013.01); *B01D 61/147* (2013.01); *B01D 63/02* (2013.01); *B01D 63/06* (2013.01); *B01D 65/00* (2013.01); *B01D 65/02* (2013.01); *B01D 2201/087* (2013.01); *B01D 2313/243* (2013.01); *B01D 2321/168* (2013.01); *B01D 2321/18* (2013.01)

(58) Field of Classification Search
CPC ...... B01D 29/66; B01D 37/00; B01D 12/006; B01D 2201/087; B01D 2123/18; B01D 2323/168; B01D 61/145; B01D 65/02; C02F 1/44; C02F 1/444
USPC ......... 210/650, 651, 636, 772, 777, 797, 411, 210/99
See application file for complete search history.

(56) References Cited

U.S. PATENT DOCUMENTS

| 2,993,599 | A | * | 7/1961 | Moon et al. ................... 210/739 |
| 3,700,550 | A | * | 10/1972 | Shiells ........................ 376/313 |
| 3,992,301 | A | * | 11/1976 | Shippey et al. ............... 210/636 |

(Continued)

FOREIGN PATENT DOCUMENTS

| AT | 408955 | | 4/2002 |
| DE | 2818127 | * | 11/1978 |

(Continued)

*Primary Examiner* — Ana Fortuna
(74) *Attorney, Agent, or Firm* — Occhiuti & Rohlicek LLP

(57) ABSTRACT

The invention relates to a method for cleaning filter structures of filtration installations for filtering liquid products containing a gas or gas mixture that is neutral to the product, in particular for filtering drinks containing the gas or gas mixture that is neutral to the product.

13 Claims, 4 Drawing Sheets

(56) References Cited

U.S. PATENT DOCUMENTS

| | | | |
|---|---|---|---|
| 4,169,789 A * | 10/1979 | Lerat | 210/636 |
| 4,222,871 A | 9/1980 | Lefeuvre | |
| 5,693,229 A * | 12/1997 | Hartmann | 210/650 |
| 5,958,244 A * | 9/1999 | Hartmann | 210/650 |
| 7,220,358 B2 * | 5/2007 | Schacht et al. | 210/636 |
| 7,273,554 B2 * | 9/2007 | Rodenberg et al. | 210/649 |
| 8,691,086 B2 * | 4/2014 | Oklejas, Jr. | 210/134 |
| 2010/0062104 A1 * | 3/2010 | Schneid | 426/11 |
| 2011/0315612 A1 * | 12/2011 | Kakigami et al. | 210/97 |
| 2012/0048814 A1 * | 3/2012 | Sander | 210/797 |
| 2012/0061303 A1 * | 3/2012 | Sander | 210/193 |

FOREIGN PATENT DOCUMENTS

| | | | |
|---|---|---|---|
| DE | 2941164 | | 6/1980 |
| DE | 4421639 | * | 1/1996 |
| DE | 10231835 | | 1/2004 |
| EP | 0526372 | * | 2/1993 |
| WO | 2007/043879 | | 4/2007 |
| WO | WO 02/26363 | * | 4/2012 |

* cited by examiner

METHOD FOR CLEANING FILTER STRUCTURES IN FILTRATION INSTALLATIONS FOR FILTERING LIQUID PRODUCTS, AND A FILTRATION INSTALLATION

CROSS REFERENCE TO RELATED APPLICATIONS

This application is the National Stage of International Application No. PCT/EP2010/004143, filed on Jul. 7, 2010, which claims the benefit of the priority date of German Patent Application No. 10 2009 034 550.7, filed on Jul. 23, 2009. The contents of both applications are hereby incorporated by reference in their entirety.

FIELD OF DISCLOSURE

The invention relates to filtration, and in particular, to filtration of liquids with a product-neutral gas.

BACKGROUND

Various methods, and filtration installations that operate according to those methods, are known for filtering liquid products, such as drinks, including beer.

A known way to filter drinks is the conventional precoat filtration method. In this method, the unfiltrate comprises the product to be filtered and a filtration aid. The filter structure consists essentially of a filter sheet formed by the filtration aid or of a filter cake.

Another known method involves filtering with a membrane filter structure. This method requires no filtration aid. Such membrane filtration systems or filtration installations offer fundamental advantages including ease of automation, as a result of its underlying simplicity, low operation costs, provided the product or filtration material is easily filterable, the ability to filter in continuous mode, powder-free and dust-free operation, arising from avoidance of filtration aids such as kieselguhr, polymer filtration aids, etc., and avoiding the need for filter sludge disposal.

Membrane filtration systems/installations also have disadvantages, including high investment costs, lengthy regeneration times for the filtration installation concerned, inability to adapt to fluctuating unfiltrate qualities, because there is no filtration aid to proportion, relatively high operating costs if the product has poor filterability, and poor plant availability if frequent regeneration of the filter structure or filter elements and their membranes is necessary.

It is also often the case that filtration using membrane filter structures or membrane filters is not economical if, because of the unfiltrate quality, the permeability of the filter structure rapidly decreases as the membranes become clogged with unfiltrate residues or with lees. In these cases, at least backwashing with product, filtrate, or water will be necessary. This entails a loss of time and product. It is also frequently unsuccessful. As a result, the entire filtration installation must be shut down and regenerated with a cleaning or flushing agent.

A further disadvantage is that the physical and chemical strain on the filter elements and/or on their membranes during the regeneration process is many times greater than it is during the filtration process. During actual filtration, the filter elements and their membranes are exposed only to minimal strain. This is because the filtration material flows slowly. The opposite is true during regeneration. Consequently the service life of the filter elements is determined not by the number of production hours but primarily by the number of regeneration cycles.

SUMMARY

It is an object of the present invention to provide a method that can achieve a simplified cleaning of filter structures in filtration installations by the detaching of unfiltrate residues.

The invention features cleaning of filter structures of filtration installations and/or the removal of unfiltrate residues by the controlled and forced and/or heightened outgassing of a product-neutral gas dissolved in the unfiltrate, i.e. by a gas bubble formation that is generated during the outgassing and that, even as it occurs, causes, a local "breaking off" of the unfiltrate residues, and whose gas bubbles, by their motion, also detach and entrain the unfiltrate residues.

The product-neutral gas can be any gas that is soluble in the liquid product and that does not alter or disturb the desired properties of the product. Examples include $CO_2$ gas, nitrogen, inert gas, and oxygen.

The product-neutral gas can be a gas that is already present in the product or filtration material to be filtered. Alternatively, the product-neutral gas is added to the filtration material or to its unfiltrate prior to filtering. If the product already contains a product-neutral gas (for example $CO_2$ gas), then one can add additional gas. Preferably, the gas that is added is identical to the already-present product-neutral gas.

In one embodiment of the invention, the filter structure is a membrane filter structure that is formed by a wall of tube-like or hollow-fiber-like filter elements and that is configured as a filter membrane. In this embodiment, the filter elements are combined together as bundles. Filtration installations having membrane filter structures of this kind are cleaned by controlled outgassing or gas release, for example continuously during the entire filtration process. During such outgassing, the operating pressure of the filtration installation is held in a controlled manner below the saturation pressure of the product-neutral gas in the filtration material.

It is also possible to carry out the cleaning periodically by outgassing the product-neutral gas. Outgassing in some embodiments is carried out at given or preselected intervals. In other embodiments, outgassing occurs at intervals that are controlled on the basis of the particular production time and/or of the volume of product already filtered.

During this cleaning, the installation pressure is briefly reduced from what it is during the normal filtration process. In one example, the reduction amounts to between 1-3 bar when the installation pressure is between 1 and 10 bar. In some embodiments, the duration of the pressure reduction is no more than ten seconds. In other embodiments, the duration is no more than five seconds.

Preferably, the pressure reduction is effected in such a way that a modified pressure differential occurs at the filter structure. This pressure differential yields a pressure on the filtrate side that is greater than the pressure on the unfiltrate side. During the periodic pressure reduction, this pressure differential drives a flow of filtrate through the filter structure. The resulting flow further promotes removal of the unfiltrate residues that are loosened by the outgassing.

By cleaning of a membrane filter structure using controlled outgassing of the product-neutral gas, it is possible to significantly extend the cycle times for the regeneration of that filter structure. This increases installation throughput and installation availability. It also extends the service life of the membrane filters or of the modules containing the filters. Ultimately, this results in a significant reduction in running costs relative to the volume of filtered product.

In a further embodiment of the invention, the filter structure is a precoat filter structure of a filtration installation, the latter being configured as a precoat filter or candle filter. In this embodiment, the controlled and forced and/or heightened outgassing of the product-neutral gas assists extraction of the filter sheet or the filter cake that forms the filter structure by being made to take place immediately before the extraction of the filter sheet or the filter cake that forms the filter structure.

In one aspect, the invention includes a method for cleaning a filter structure of a filtration installation for filtering a liquid product containing a product-neutral gas. Such a method includes, at least once during a filtration operation, depressurizing liquid product inside the filtration installation to a pressure that is below a saturation pressure of the product-neutral gas contained in the liquid product. This depressurization causes outgassing of the product-neutral gas so as to remove unfiltrate residues from the filter structure.

In some practices of the invention, the liquid product comprises a product that originally contains the product-neutral gas. In others, the product-neutral gas is added.

Practices include those in which the product-neutral gas comprises carbon dioxide gas, nitrogen gas, inert gas, oxygen gas, and combinations of the foregoing gases in gas mixtures.

Practices of the invention can include feeding the liquid product to the filtration installation at a temperature ranging from −2° C. to +5° C.

Some practices of the invention further include adding the product-neutral gas to the liquid product before passing the liquid product to the filter structure.

Other practices include those in which depressurizing comprises depressurizing by 1-4 bar as well as those in which depressurizing lasts for no longer than ten seconds.

In some practices of the invention, the filter structure comprises a membrane filter structure. In some of these practices, depressurizing for the cleaning of the filter structure is effected periodically during the filtration operation.

Also included are practices in which depressurizing comprises selectively controlling a feed pump for feeding the liquid product.

In certain other practices, the filter structure separates the filtration installation into an unfiltrate side and a filtrate side separated by a filter structure. In some of these practices, depressurizing comprises depressurizing the unfiltrate side.

Also among these practices are those in which the filter structure comprises a membrane filter structure. Among these are practices in which depressurizing comprises causing outgassing continuously throughout the duration of the filtration operation by reducing an operating pressure, at least on the unfiltrate side, to below the saturation pressure of the product-neutral gas in the liquid product. Others of these embodiments include providing a depressurizing device on the unfiltrate side. In yet other embodiments, the filter structure comprises a precoat filter structure with a filter sheet or filter cake formed by a filtration aid, and depressurizing for removing or loosening unfiltrate residues comprises outgassing the product-neutral gas before regeneration of the filtration installation.

In another aspect, the invention features an apparatus for filtering a liquid product that contains a product-neutral gas. Such an apparatus includes a filtration installation having a filter structure for filtering the liquid product, and means for depressurizing the liquid product inside the filtration installation at least once during a filtration operation to a pressure below a saturation pressure of the product-neutral gas present in the liquid product for the cleaning of the filter structure by way of outgassing of the product-neutral gas. The resultant outgassing removes unfiltrate residues from the filter structure.

Embodiments include those in which the filter structure comprises a membrane filter structure, and those in which the filter structure comprises a precoat filter structure.

In some embodiments, the means for depressurizing comprises a controllable product feed pump.

Also among the embodiments are those in which the filter structure separates the filtration installation into an unfiltrate side and a filtrate side, and wherein the unfiltrate side is configured for the depressurization. Among these are embodiments in which the unfiltrate side is configured for a depressurization of 1-4 bar, and those in which the unfiltrate side is configured for periodic depressurization lasting for no more than five seconds.

As used herein, the term "unfiltrate residues" means the materials or lees removed from the product during filtration, including any filtration aids with such materials or lees removed during filtration.

If the product-neutral gas is not desired in the filtrate and/or in the end product obtained by filtration either at all or only in reduced concentration, then the filtrate is degassed in an installation downstream of the filtration installation.

BRIEF DESCRIPTION OF THE FIGURES

The invention is explained in detail below through the use of exemplary embodiments with reference to the figures, in which.

DETAILED DESCRIPTION

Figure 1:
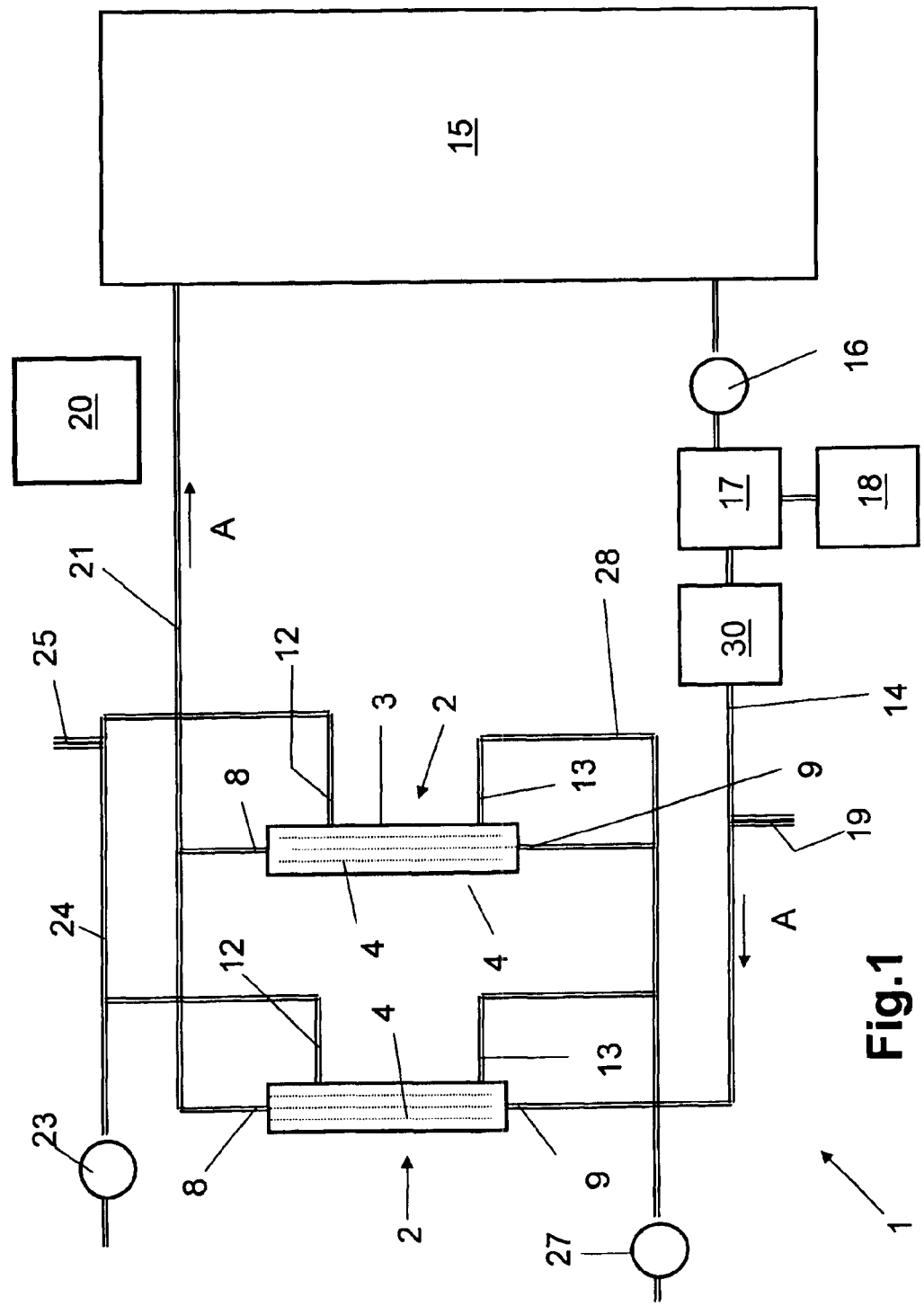
FIG. 1 shows a simplified functional representation of a filtration installation for filtering liquid products, in particular beer or beer-like beverages.

FIG. 1 shows a filtration installation 1 for the filtration of liquid products, such as drinks, and in particular, beer. For this purpose, the filtration installation 1 comprises filter modules 2 in a housing 3. Each filter module 2 has tube-like filter elements 4, each of which has a membrane filter.

Figure 2:
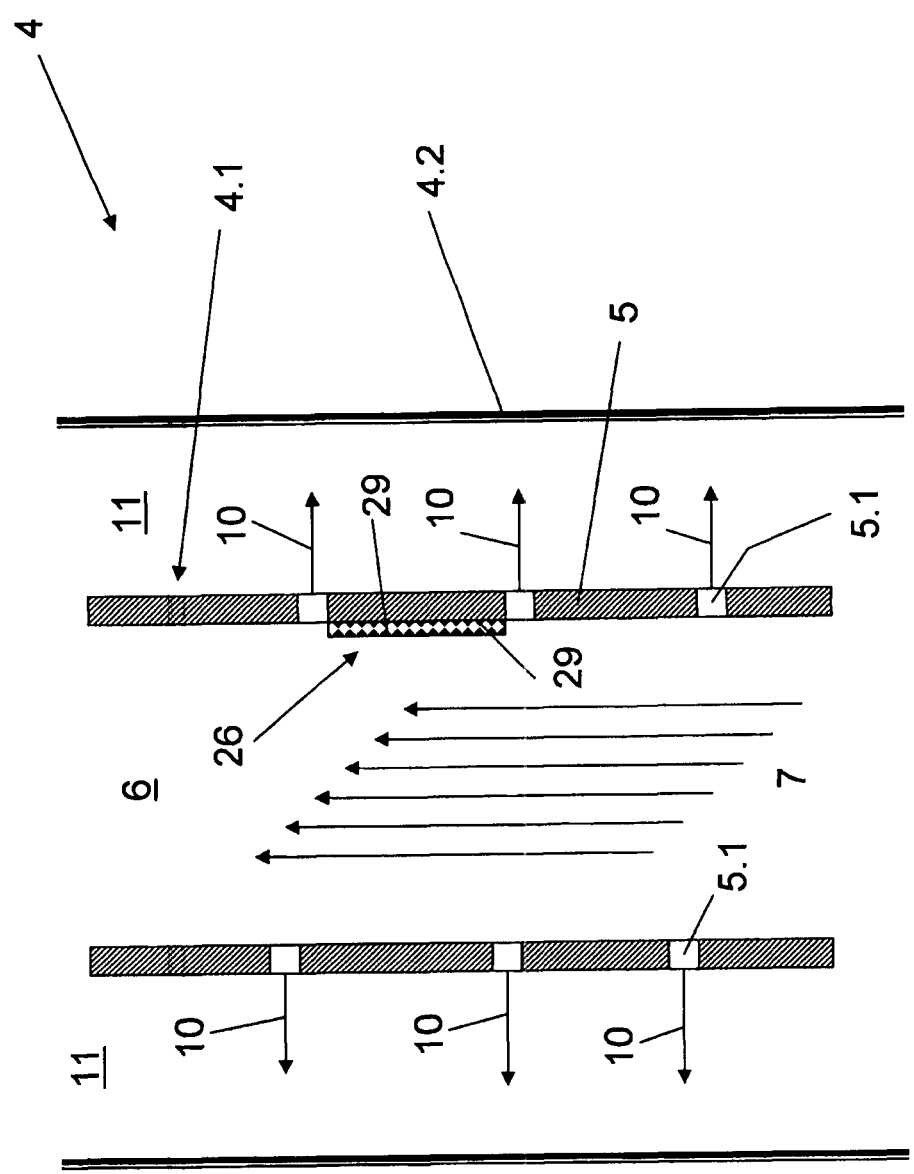
FIG. 2 shows a simplified partial representation of one of the filter elements that form the filter modules of filtration installation in FIG. 1.

As shown in FIG. 2, the individual filter elements 4 that form a particular filter module 2 consist of hollow fibers 4.1 that extent across the full length of the filter element 4. The hollow fibers 4.1 are made of a material suitable for filter membranes. Examples include plastic, such as PES (polyethersulfone) or PP (polypropylene). Each hollow fiber 4.1 has a wall forming a membrane 5 with pores 5.1. In particular embodiments, the wall thickness ranges from 0.8 to 1.5 µm.

The hollow fibers 4.1 combine to create fiber bundles, each of which has approximately 2,000 fibers. At their ends, the hollow fibers 4.1 fuse with one another and with a filter element housing 4.2 that encloses the particular bundle.

Each hollow fiber 4.1 forms an unfiltrate channel 6 that is open at both ends. During filtration, unfiltrate 7 flows through this unfiltrate channel 6. As a result, inside the filter element housing 4.2 there is formed a filtrate chamber 11 surrounding the hollow fibers 4.1. The filtrate chamber 11 or filtrate channel is common to all of the filter elements 4.

Filtration takes place at the membrane 5 that forms the wall of a particular hollow fiber 4.1. The filtrate, as indicated by arrows 10 in FIG. 2, enters the filtrate chamber 11 surrounding the hollow fiber bundle and then passes into the filtrate channel of the filter module 2.

All filter elements 4 are disposed in the housing 3 parallel to one another and open out with the upper and lower end of their unfiltrate channels 6 into chambers that, in FIG. 1, form corresponding upper and lower unfiltrate connections 8, 9 of the filter module 2.

To simply the drawing, FIG. 1 shows only two filter modules 2. In practice, the filtration installation 1 will often have than two filter modules 2. These filter modules 2 are arranged parallel to one another in an unfiltrate circuit, as shown in FIG. 1.

The unfiltrate circuit comprises a first line 14 that passes through a first feed pump 16, a proportioning circuit 17, and a first pressure sensor 19. The first line 14 ultimately connects to the lower unfiltrate connections 9 and that feeds the unfiltrate from an unfiltrate source 15.

The first feed pump 16 generates the required flow A of unfiltrate through the filter modules 2 during filtration operations.

If necessary, the proportioning circuit 17 adds product-neutral gas from a gas source 18 in a proportioned manner. As used herein, product-neutral gas includes a gas mixture. Examples of product-neutral gas include $CO_2$ gas, nitrogen, inert gas, oxygen, and mixtures thereof.

The first pressure sensor 19 measures the pressure of the unfiltrate in the first line 14 on the unfiltrate side of the filter modules 2 and the filtration installation 1. It then delivers a corresponding measurement signal to a control unit 20. Meanwhile, a second line 21 connects the upper connections 8 of the filter modules 2 back to the source 15. This second line 21 returns unfiltrate to the source 15 after it has flowed through the filter modules 2.

The filtrate that accumulates in the filter modules 2 on the filtrate side is passed to a further use and/or treatment through a filtrate line 24 that is connected to a first connection 12. The filtrate line 24 passes through a second feed pump 23 and a second pressure sensor 25. The second pressure sensor 25 sends the control unit 20 a signal corresponding to the current pressure in the filtrate line 24. The second feed pump 23 generates flow away from the filter modules 2.

Referring back to FIG. 2, during normal filtration, deposits 26 build up on the inner surface of an unfiltrate channel 6 or on the inner surface of membranes 5. These deposits, which typically consist of unfiltrate residues or lees, have a tendency to clog the pores 5.1 of the membranes 5. For this reason, the filtration installation 1, and in particular the filter modules 2, are regenerated by backwashing at certain intervals during continuous filtration. This ends to free pores 5.1 and separate the deposits 26 from the inside surface of the hollow fibers 4.1. As shown in FIG. 1, a second connection 13 connects to a backwash line 28 that has a third feed pump 27 for backwashing.

Regeneration imposes a heavy strain on the filter elements 4 and/or the hollow fibers 4.1. As a result, the service life of the filter elements 4 is determined less by the normal operating time of the filtration installation 1 and more by the number of regenerations. In order to reduce the number of regenerations per volumetric amount of filtration material, and thereby to increase the service life of the filter elements 4, it is useful to periodically carry out a controlled heightened outgassing of product-neutral gas from the unfiltrate 7 to clean or blow clear the membranes 5, and in particular, their pores 5.1. These outgassing events are repeated at pre-defined intervals.

In some practices, the pre-defined intervals depend on the volumetric amount of the filtered product.

For this purpose, and especially when the unfiltrate does not already originally contain, or contain enough of, a product-neutral gas, product-neutral gas, the mixing circuit 17 adds product-neutral gas to the unfiltrate and does so proportioned in such a way that, allowing for the temperature of the unfiltrate, which ranges between −2 and +5° C. for example, and allowing for the operating pressure of the filtration installation 1, i.e. for the pressure of unfiltrate 7 and of filtrate 10 in normal operation of the filtration installation 1, there is no release, or at least no excessive release, of the product-neutral gas from the unfiltrate 7 and the filtrate 10.

If the product-neutral gas is not wanted in the filtrate 6 or in the end product, then the filtrate 10 is degassed in a separate installation connected to the filtrate outlet.

For the periodic cleaning of filter elements 4 and/or of membranes 5 and of pores 5.1, the pressure in filtration installation 1 and preferentially the pressure on the unfiltrate side of the installation is briefly reduced below the saturation pressure of the product-neutral gas. In one example, this is carried out by depressurizing the first line 14 and, optionally, the second line 21. In another example, this is carried out by an appropriate triggering of first feed pump 16 and, if necessary, the second feed pump 23.

The pressure reduction causes an increased release of the product-neutral gas. The release manifests itself in bubbling throughout, including formation of bubbles 29 within the deposit 26 and inside the pores 5.1. The bubble 29 blow off the deposits 26, thus removing lees from the inside surface of the hollow fibers 4.1 and from the pores 5.1. These deposits, now fragmented and free, are then entrained with the unfiltrate flow.

When cleaning is complete, the unfiltrate pressure or the total pressure of filtration installation 1 is returned to saturation pressure or above.

Some embodiments include reducing only the unfiltrate pressure or the pressure on the unfiltrate side of filtration installation 1 during cleaning. This causes a pressure gradient from the filtrate side to the unfiltrate side is achieved. As a result, in addition to pores 5.1 being cleaned by the outgassing product-neutral gas, a reverse flow of filtrate across to the unfiltrate side of filtration installation 1 is brought about. This results in additional washing of the membranes 5 and/or of their pores 5.1. This reverse filtrate flow reliably removes loosened lees from the pores 5.1 and from the inside surface of hollow fibers 4.1.

The unfiltrate is passed to the filtration installation 1 at a pressure in the range of approximately 1-10 bar depending on the product, the temperature and the proportion of the product neutral gas. In one example, the pressure reduction for the cleaning of filter elements 4 ranges from 1 to 3 bar.

During periodic cleaning by outgassing there is a brief pressure reduction. In some embodiments, the pressure reduction lasts for less than ten seconds. In preferred embodiments, the pressure reduction lasts for under five seconds.

Some embodiments carry out pressure reduction by a simple depressurization, for example on the unfiltrate side of filtration installation 1. Other embodiments carry out pressure reduction by selectively triggering the first feed pump 16. Among these are embodiments in which the first feed pump 16 has a frequency-controlled electric motor. In these embodiments, the pressure reduction can be carried out in a particularly simple manner by triggering this frequency-controlled electric motor.

Other embodiments include continuously cleaning the filter elements 4 by continuous release of the product-neutral gas. These embodiments include adding the product-neutral gas to the unfiltrate that is being fed under pressure while being proportioned as a function of at least the temperature of the unfiltrate. This results in the unfiltrate pressure being equal to or greater than the saturation pressure.

The unfiltrate, to which the product-neutral gas has been added in this way, is then passed across a pressure-reducing device 30 to the filter elements 4 at a pressure that is reduced below saturation pressure. In some embodiments, the pressure-reducing device 30 is a pressure-reducing additional feed pump.

As a result of the pressure reduction carried out at the pressure-reducing device 30, during the ongoing filtration process, there is a continuous release of product-neutral gas from the unfiltrate and the filtrate, especially in the region of the membranes 5. The gas bubbles 29 produced during this continuous release of product-neutral gas tend to remove the lees from the inside surfaces of the hollow fibers 4.1 and from the pores 5.1 of the membranes 5.

In the embodiments described above, a product-neutral gas is added to the unfiltrate for the cleaning of the filter elements 4. However there are also cases in which the product that is to be filtered, or its unfiltrate, often already contains a product-neutral gas. Typical examples are carbonated beverages or beer, in which the product-neutral gas is $CO_2$ gas.

In those cases in which the product to be filtered already has product-neutral gas to begin with, it is possible to clean the filter elements 4 by operating the filtration installation 1 in normal operating mode with a total installation pressure, i.e. with an unfiltrate pressure and filtrate pressure, that is at least approximately equal to the saturation pressure of the $CO_2$ gas in the unfiltrate. During the periodic cleaning of filter elements 4 and/or of their membranes 5, the unfiltrate pressure or the total installation pressure, i.e. the unfiltrate-side and the filtrate-side pressure of the filtration installation 1, is reduced to below the current saturation pressure. This reduction can be carried out by controlling the output of one or more of the first and third feed pumps 16, 23 such that, in the manner described above, the removal of the lees from the inside surface of hollow fibers 4.1 and from pores 5 is effected by bubbles 29 of the released $CO_2$ gas.

For an especially effective removal of the lees from the pores 5.1 and removal of the deposits 26, it is also particularly advantageous to reduce only the pressure on the unfiltrate side during the periodic cleaning of the filter elements 4. Doing so achieves a reverse flow of filtrate through the membrane 5 resulting from a pressure gradient thus created between the filtrate side and the unfiltrate side.

During the filtration of products whose unfiltrate already contains the product-neutral gas and to which the addition of this gas in the mixing circuit 17 is essentially not necessary, there is still the possibility of a continuous cleaning of the filter elements 4 by release or outgassing of the product-neutral gas. In such embodiments, the unfiltrate is supplied to the filtration installation 1 at a pressure at least equal to the saturation pressure. However, the filtration installation 1 is operated at an operating pressure that is below the saturation pressure. This results in continuous bubbling during the filtration process, including in the region of membranes 5. The mechanical agitation associated with the resulting bubbles 29 promotes separation of the lees from the membranes 5 and from their pores 5.1.

Regardless of whether the cleaning of the filter elements 4 by a release of the product-neutral gas is periodic or continuous, and regardless of whether or not the product to be filtered already contains a product-neutral gas, it is possible to add further product-neutral gas to the unfiltrate in the mixing circuit 17 so as to render the periodic or continuous cleaning of the filter elements 2 particularly effective.

The removal, by bubbles 29, of the lees or of the deposits 26 that they create is assisted by the fact that, because of the direction of flow of unfiltrate 7 and the density difference in the unfiltrate, the bubbles 29 rise and entrain the lees that still adhere to the membranes 5 and/or that are blown out or squeezed out of the pores 5.1 by the gas bubbles 29.

Cleaning the filter elements 4 significantly improves the permeability of the filter structure that is formed by filter elements 4. It also lengthens the interval between regeneration operations and thus extends the service life of the filter elements 4. This reduces filtration costs per unit of volume of the filtered product.

Figure 3:
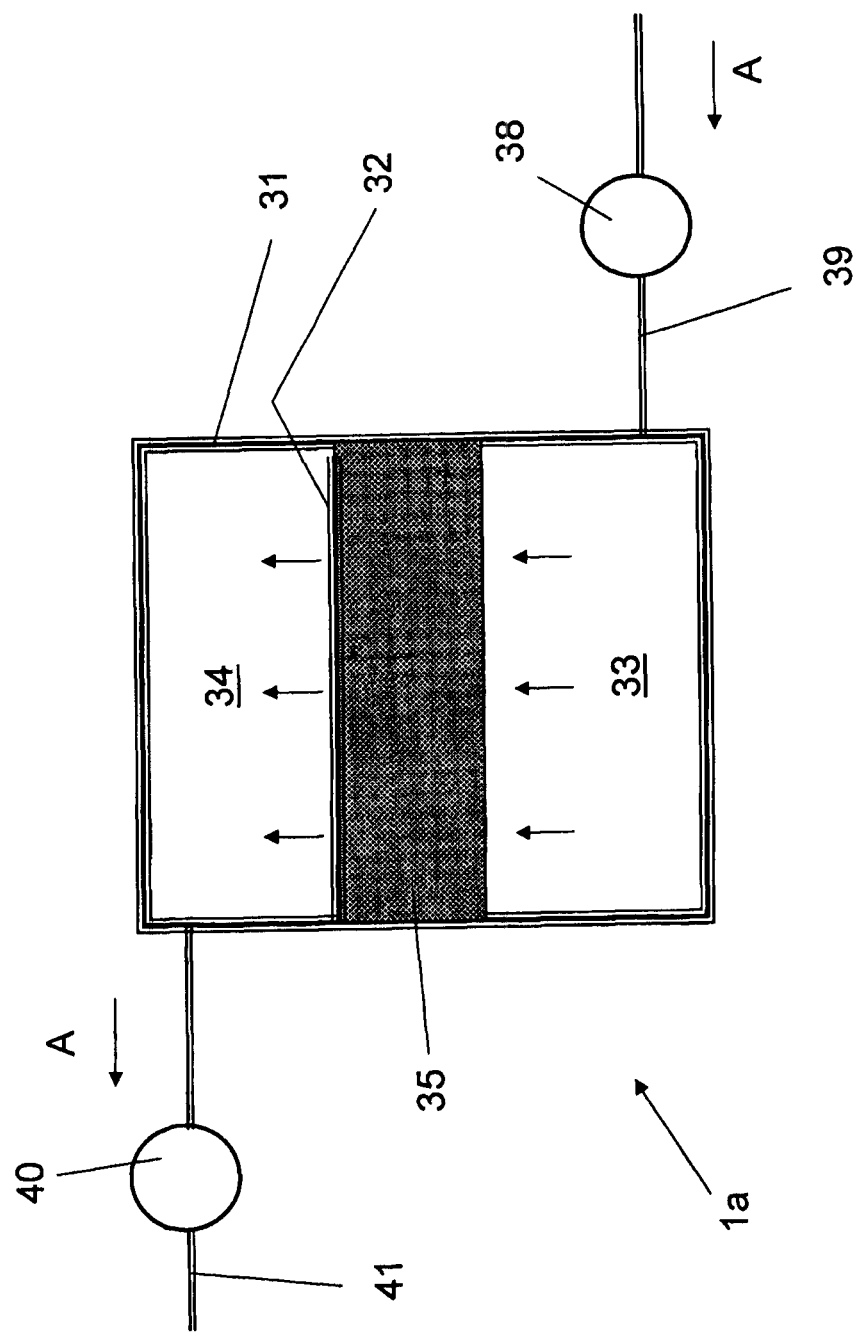
FIG. 3 shows a simplified schematic depiction of a further embodiment of a filtration installation with a filter structure formed by a plurality of filter candles.
Figure 4:
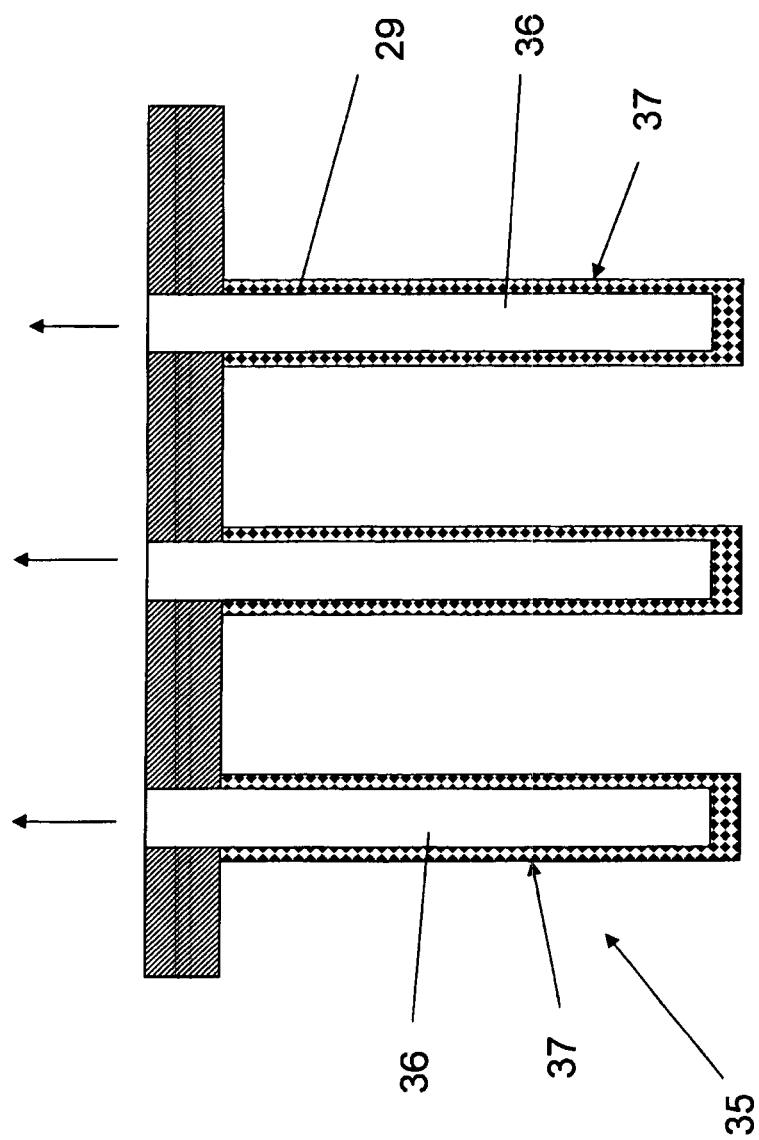
FIG. 4 shows an enlarged schematic depiction of several filter candles of the filtration installation in FIG. 3.

FIG. 3 shows a schematic representation of a filtration installation 1a that is configured as a candle filtration installation. The filtration installation 1a includes a boiler 31 having an interior that is tightly sealed from the exterior, at least during the filtering process. A partition 32 divides the interior of the boiler 31 into a lower unfiltrate chamber 33 and an upper filtrate chamber 34. A filter structure 35 is formed at or below the partition 32. As shown in FIG. 4, the filter structure 35 comprises a plurality of filter candles 36 and a filter cake 37 that is deposited on these filter candles. The filter cake 37 consists of a filtration aid.

The unfiltrate that contains the filtration aid is passed in a feed direction A to the unfiltrate chamber 33 through a line 39 that incorporates a feed pump 38.

The product flows across the filter structure 35 and arrives as filtrate in the filtrate chamber 34. From the filtrate chamber 34, the product is supplied in a feed direction A to a further use through a line 41 that incorporates a feed pump 40.

The unfiltrate that is fed to the unfiltrate chamber 33 may originally contain a product-neutral gas, e.g. $CO_2$ gas. If it does not, the product-neutral gas is added to the unfiltrate prior to passing it through to filtration installation 1a.

During normal filtration, the operating pressure of the filtration installation 1a, i.e. the pressure in the filtrate chamber 33 and in the unfiltrate chamber 34, is at least equal to the saturation pressure. As a result, no release or outgassing of the product-neutral gas from the product takes place, including, in particular, within the region of the filter candles 36 or in the region of the filter cake 37 and hence also within the region between the outside surface of the filter candles 36 and the filter cake 37.

It is only when the filter cake 27 is to be extracted for the purpose of regenerating filtration installation 1a that immediately prior to this, the pressure inside the filtration installation 1a is reduced to below saturation pressure such that a separation of the filter cake 37 from the filter candles is brought about, or at least assisted, by the resulting forced outgassing of the gas from the product in general and from the unfiltrate in the unfiltrate chamber 33 in particular, or by the gas bubbles 29 thereby produced.

The invention has been described by reference to embodiments. It goes without saying that numerous variations as well as modifications are possible without departing from the inventive concept underlying the invention.

The invention claimed is:

1. A method for cleaning a filter structure of a filtration installation for filtering a liquid product containing a product-neutral gas, said method comprising: at least once during a filtration operation, depressurizing liquid product inside the filtration installation to a pressure that is below a saturation pressure of the product-neutral gas contained in the liquid product, thereby causing outgassing of the product-neutral gas so as to remove unfiltrate residues from the filter structure.

2. The method of claim 1, wherein the filter structure separates the filtration installation into an unfiltrate side and a filtrate side separated by a filter structure, and wherein depressurizing comprises depressurizing the unfiltrate side.

3. The method of claim 2, wherein the filter structure comprises a membrane filter structure, and wherein depressurizing comprises causing outgassing continuously throughout the duration of the filtration operation by reducing an operating pressure, at least on the unfiltrate side, to below the saturation pressure of the product-neutral gas in the liquid product.

4. The method of claim 2, further comprising providing a depressurizing device on the unfiltrate side.

5. The method of claim 2, wherein the filter structure comprises a precoat filter structure with a filter sheet or filter cake formed by a filtration aid, and wherein depressurizing for removing or loosening unfiltrate residues comprises outgassing the product-neutral gas before regeneration of the filtration installation.

6. The method of claim 1, further comprising adding the product-neutral gas to the liquid product before passing the liquid product to the filter structure.

7. The method of claim 1, wherein the liquid product comprises a product that originally contains the product-neutral gas.

8. The method of claim 1, wherein the product-neutral gas comprises a gas selected from the group consisting of carbon dioxide gas, nitrogen gas, an inert gas, and oxygen gas.

9. The method of claim 1, further comprising feeding the liquid product to the filtration installation at a temperature ranging from $-2°$ C. to $+5°$ C.

10. The method of claim 1, wherein depressurizing comprises depressurizing by 1-4 bar.

11. The method of claim 1, wherein depressurizing comprises depressurizing for a maximum time of no more than 10 seconds.

12. The method claim 1, wherein the filter structure comprises a membrane filter structure, and wherein depressurizing for the cleaning of the filter structure is effected periodically during the filtration operation.

13. The method of claim 1, wherein depressurizing comprises selectively controlling a feed pump for feeding the liquid product.

* * * * *